United States Patent [19]
Fuchs

[11] 3,975,469
[45] Aug. 17, 1976

[54] DEVICE FOR REVOLVING LIQUIDS AND SUPPLYING GAS THERETO

[75] Inventor: Hubert K. E. Fuchs, Mayen, Germany

[73] Assignee: The De Laval Separator Company, Poughkeepsie, N.Y.

[22] Filed: Jan. 17, 1975

[21] Appl. No.: 542,040

[30] Foreign Application Priority Data
Jan. 23, 1974 Austria ................................ 536/74

[52] U.S. Cl. .................................. 261/87; 259/32; 261/91; 261/93; 261/DIG. 71; 416/176; 416/234
[51] Int. Cl.² ............................................ B01F 3/04
[58] Field of Search .................. 261/85, 86, 87, 93, 261/121 R, 83, 84, 91, 28, 29, 31, DIG. 71; 259/30–32; 416/234, 176

[56] References Cited
UNITED STATES PATENTS

| | | | |
|---|---|---|---|
| 2,151,939 | 3/1939 | Richardson | 416/234 |
| 2,244,902 | 6/1941 | Stich | 261/93 X |
| 2,928,661 | 3/1960 | MacLaren | 261/87 X |
| 3,378,141 | 4/1968 | Warman | 261/93 X |
| 3,438,890 | 4/1969 | Neighbor | 261/87 X |
| 3,782,702 | 1/1974 | King | 261/87 |

FOREIGN PATENTS OR APPLICATIONS

| | | | |
|---|---|---|---|
| 193,813 | 12/1957 | Netherlands | 261/87 |
| 879,081 | 6/1953 | Netherlands | 261/93 |

*Primary Examiner*—Frank W. Lutter
*Assistant Examiner*—William Cuchlinski, Jr.
*Attorney, Agent, or Firm*—Cyrus S. Hapgood

[57] ABSTRACT

A device for revolving a liquid has a hollow shaft for supplying gas to the liquid, and the free end of the shaft is immersed in the liquid where it carries a propeller for revolving the liquid. The propeller comprises at least one screw-shaped vane, and at least part of the vane's surface forms an acute angle with the longitudinal axis of the hollow shaft, as seen from the free end of the shaft, the vane extending along at least two thirds of the circumference of the shaft.

11 Claims, 15 Drawing Figures

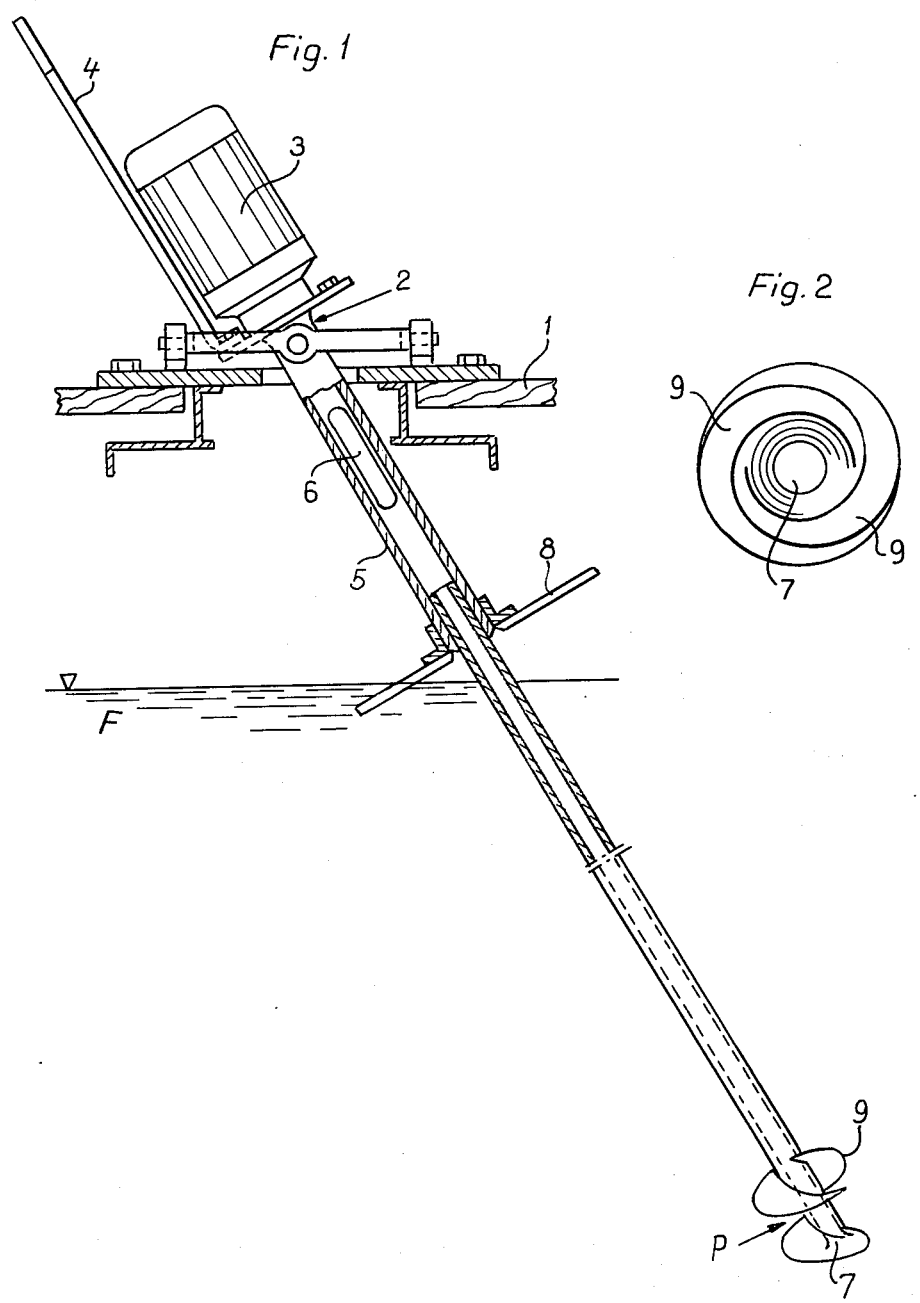

DEVICE FOR REVOLVING LIQUIDS AND SUPPLYING GAS THERETO

The present invention relates to devices for supplying gas to liquids, such as aqueous liquids, and revolving the liquids. More particularly, the invention relates to such devices of the type commonly used for biological purification and which include a hollow shaft for supplying gas to the liquid and a propeller carried by the free end of the shaft, which is immersed in the liquid.

Devices of this type are known in the art, as through Austrian patent No. 276,262. The device there disclosed is of practical interest especially for aerating waste waters containing organic substances. However, such devices are also useful for other purposes, as for precipitating divalent iron from water by oxidation to three-valent iron or for removing carbonic acid from steam boiler water by aerating.

In biological purification of waste waters which contain organic solids, sediments are often formed which are so firm that anaerobic zones occur within them, what leads to formation of foul-smelling substances. In prior aerating devices, a great amount of energy is consumed for revolving the liquid so as to prevent formation of zones of stagnant liquid and sedimentation, as compared with the quantity of energy necessary for mixing air or oxygen with the liquid.

According to the present invention, it is now possible to effect the necessary mixing in of gas and revolving of the liquid with the use of an appreciably reduced amount of energy. Because the device produces a liquid jet which is kept well together and directed axially, it is possible by suitable adjustment of the shaft in the liquid container to avoid undesired sedimentation and formation of zones of stagnant liquid.

According to the invention, the new device is characterized in that the propeller consists of at least one screw-shaped vane, at least a part of the surface of which forms an acute angle with the longitudinal axis of the hollow shaft, as seen from the free end of the shaft, and which vane extends along at least two thirds of the circumference of the hollow shaft. A preferred embodiment is characterized in that the vane is arched in the direction towards the free end of the hollow shaft. Due to the length of the vane and the inclination of the vane surface, the liquid flow produced by the vane when the shaft rotates, and which moves between adjacent vane surface parts, is provided with a screw movement which sucks air from the hollow space of the shaft and mixes it well with the liquid.

Through the use of at least two vanes, preferably three, uniformly distributed around the circumference of the shaft, there are provided a plurality of outlet openings for the liquid from the propeller and thereby an improved dynamic balance of the device. This gives a smooth running of the shaft and consequently low loads on the bearings.

According to an additional feature of the invention, the pitch of the vane can decrease in the axial direction towards the free end of the hollow shaft. In this way, a desired acceleration of the liquid movement is obtained owing to the decreasing cross-section of the interspace between adjacent vane surfaces.

Since the liquid jet produced by the propeller is directed axially, this jet can be directed towards such places where dead zones or sediment formations easily can occur. To this end the hollow shaft can be carried by a cardan joint.

Sticking of solids to the inlet edge of the vane for the liquid can be avoided by increasing the radius of the vane towards the free end of the hollow shaft from zero. Through this circumstance, the solids only slide past the vane.

The liquid velocity of the jet can also be increased, so that the air can be sucked better with the liquid, if the opening of the free end of the hollow shaft widens as a funnel.

In order to prevent solids from sticking to the free end of the hollow shaft, a vane surface at this shaft end is joined at its outer edge to an adjacent vane surface in such a manner that a rounded, concave surface is formed, which is situated on the side facing away from the hollow space of the shaft. Through an arrangement of this concave surface at a distance radially outside the outside of the shaft, the velocity of the axial liquid jet is accelerated.

An additional feature of the invention is characterized in that the free end of the hollow shaft extends a distance past the end of the vane. The liquid jet leaving the vane end has the form of an oscillation with bulges and nodes; and when the position of the outlet opening of the hollow shaft is adjusted in such a manner that said opening is situated at the greatest diameter of the jet bulge, the depression and consequently the quantity of air sucked with the liquid are increased.

The depression and consequently the quantity of air sucked with the liquid are also increased if the vane extends a distance past the free end of the hollow shaft like a fin.

A further feature of the invention is characterized in that the wall of the hollow shaft has at least one opening, which is situated between adjacent vane surfaces, and that a covering sheet extends above said opening mainly tangentially in the flow direction of the liquid from the outside of the hollow shaft. At the end of a covering sheet, a liquid flow moving between adjacent vane surfaces will then jump from a greater radius back to the radius of the hollow shaft, a depression being formed which sucks air from the hollow shaft.

Above the liquid level, radially directed but helically shaped arms can be fixed to the hollow shaft. These arms serve to beat asunder the formed foam, and their helical shape prevents sticking of solids to said arms when the hollow shaft rotates in the operating direction, for the solids then slide off the arms.

If the arms are inclined in cross section in such a way that they act as fan vanes, they can suck foam from the foam layer and beat it asunder during operation of the hollow shaft.

The invention is described more in detail below with reference to the accompanying drawings, in which FIG. 1 is an elevational view, partly in section, of an example of the present invention;

FIG. 2 is an end view of the propeller shown in FIG. 1, viewed toward the free end of the hollow shaft;

Figure 3:
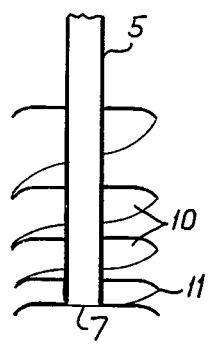
FIGS. 3 through 7 are longitudinal sectional views of five different embodiments of the propeller fixed to the hollow shaft and with differently shaped vanes of which the pitch decreases in the axial direction toward the free end of the hollow shaft.
Figure 4:
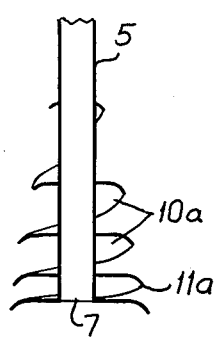
Figure 5:
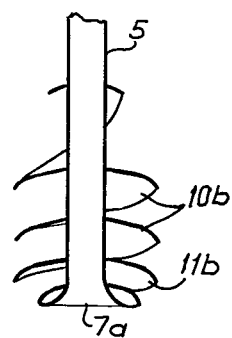

The mixing device as shown in FIG. 1 dips down into a container for the liquid F to be treated. A stationary beam 1 supports a cardan 2 (i.e., a universal joint that transmits motion unchanged) in which the rotary mixing device is journalled so that it can be swung in all directions and be locked in any desired operating position.

The mixing device itself comprises a driving motor 3 with a lever 4 by which the motor can be swung on the joint 2. A hollow shaft 5 is rigidly connected to and driven by the motor 3. At its lower end, shaft 5 carries a propeller P immersed in the liquid F. Above the liquid level, shaft 5 has openings 6 for sucking in air, while the free lower end of the shaft has an axial outlet opening 7. Just above the liquid level, the hollow shaft 5 carries a foam knife 8 with radially extending arms which are preferably helical. A disc (not shown) can be provided on the hollow shaft as a splash guard below the air suction openings 6. The propeller P, fixed to the hollow shaft just above its axial outlet opening 7, consists in this simple case of two similar but diametrically opposed vanes 9 each making about one full pitch turn.

Figure 6:
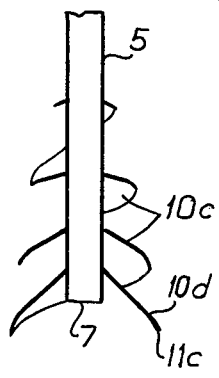

The four modifications of the propeller shown in FIGS. 3 through 6 are different geometrical fundamental shapes of two vanes displaced 180° in relation to each other on the shaft 5. According to FIG. 3, the two vanes 10 have constant radius and are slightly arched as a shovel along their outer edges 11. In the embodiments according to FIGS. 4 through 7, the radius of the two vanes 10a, 10b or 10c starts from practically zero at the upper ends of the vanes and continuously increases along the length of the vanes towards the opening 7 or 7a. While in the embodiments according to FIGS. 3, 4 and 7 only the outer edge 11 or 11a of the vanes is arched in such a manner that this outer edge forms an acute angle with the longitudinal axis of the hollow shaft, as seen from the free end of the shaft, the whole vane surface 10b or 10c in the embodiments according to FIGS. 5 and 6 forms in the same manner an acute angle. According to FIG. 5, the opening 7a of the lower end of the hollow shaft widens as a funnel and passes over to the outer edges 11b of the vanes 10b. FIG. 6 shows a modification of the propeller P, the vanes 10c of which extend a distance past the outlet opening 7 like fins 10d.

Figure 7:
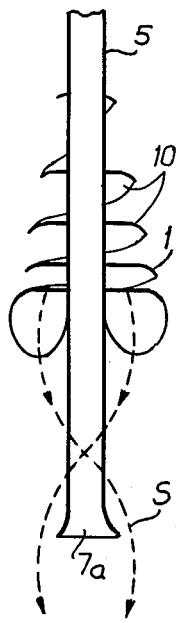

FIG. 7 illustrates an additional advantageous embodiment of the propeller P, in which the free end portion of the hollow shaft 5 (also here having an outlet opening 7a widening like a funnel) extends to an appreciable amount past the lower end of the vanes 10a. When the vanes have a correct shape, the water jet S flowing away in the axial direction from the propeller P has the form of narrowly bundled whirl plait with bulges and nodes like an oscillation figure. When the low end of the hollow shaft 5 extends past the ends of the vanes 10a by the amount of about half a so-called wavelength of this whirl jet S (thus past the first oscillation node and to a place within the second oscillation bulge), an optimum effect is obtained, namely a very intense whirling-through of the water jet S with air in the form of very small bubbles and consequently a long holding time and a correspondingly great reach of the water jet S, enriched with oxygen.

Figure 8:
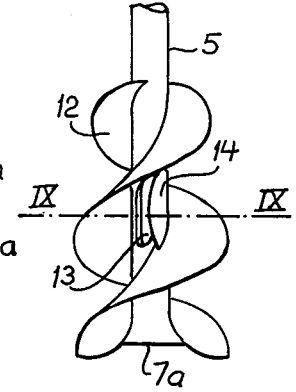
FIG. 8 is a side view of a propeller and hollow shaft with openings in the wall of the latter.
Figure 9:
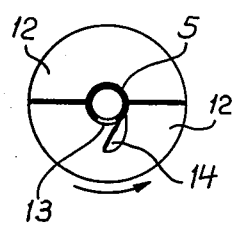
FIG. 9 is a sectional view along line IX—IX in FIG. 8.

In FIGS. 8 and 9 there is shown another suitable shape of the propeller P, in which an additional air outlet opening 13 is provided in the wall of the hollow shaft 5 at a place between the two vanes 12. This opening is shielded by means of a part 14 cut out from the wall of the shaft. Also in this embodiment, as in the example according to FIG. 7, an especially intense whirling-through of the water jet S with air is obtained.

Figure 10:
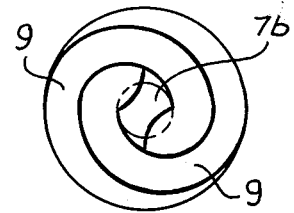
FIG. 10 is an end view of a modification of the propeller.

FIG. 10 shows another embodiment of the outlet opening of the hollow shaft, in which the widened outlet opening 7b has a shape with two points and a longitudinal, S-shaped center line and partly passes over to the edges of the vanes 9.

Figure 11:
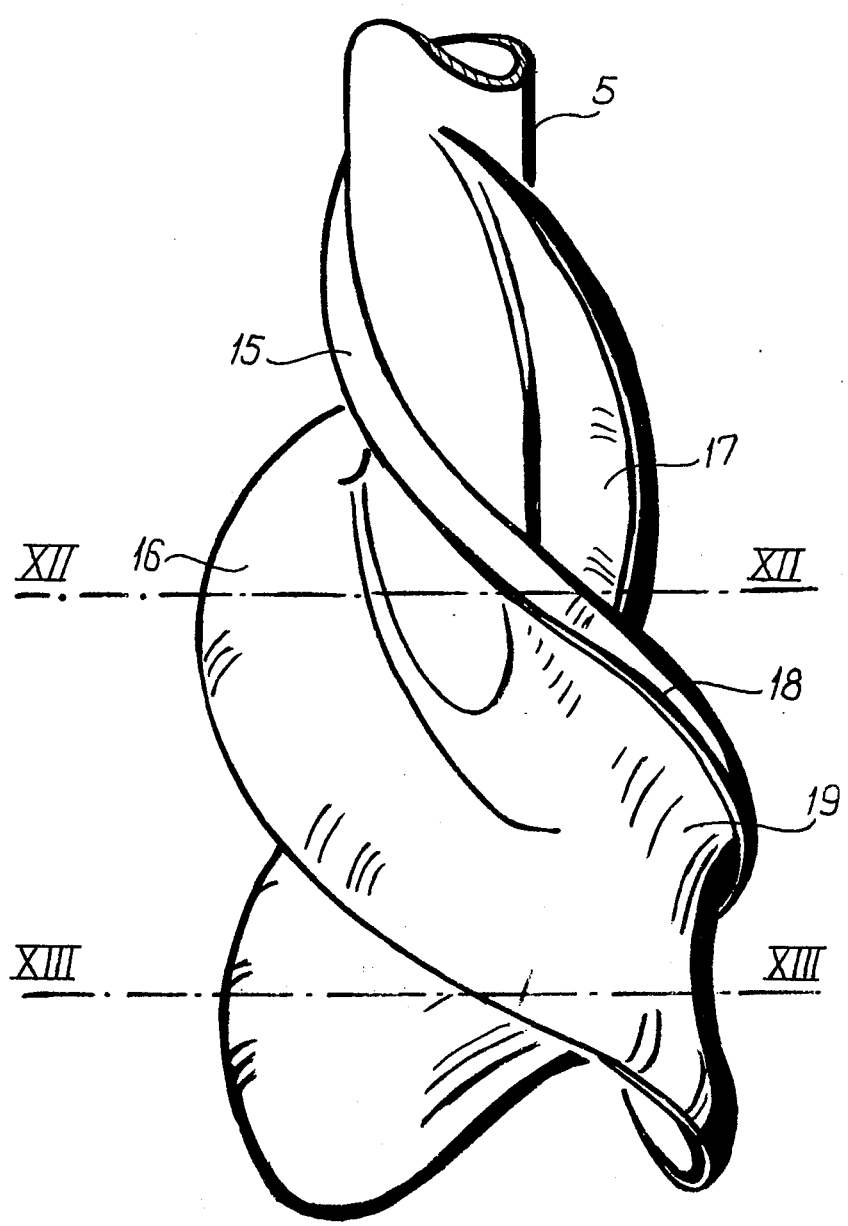
FIG. 11 is an elevational view of a propeller with three vanes uniformly distributed around the circumference of the hollow shaft.

FIG. 11 shows more in detail the arrangement of three vanes 15, 16 and 17 which are uniformly distributed around the circumference of the hollow shaft 5. The radius of these vanes is increased at the lower end of the hollow shaft, and the outer edge 18 of each vane is joined to the surface of an adjacent vane in such a manner as to form a rounded, concave surface 19 which faces away from the hollow space of the shaft and is situated radially outside the outer surface of the shaft. This prevents solids from sticking to the free end of the hollow shaft. Furthermore, the velocity of the axial liquid jet is accelerated.

Figure 12:
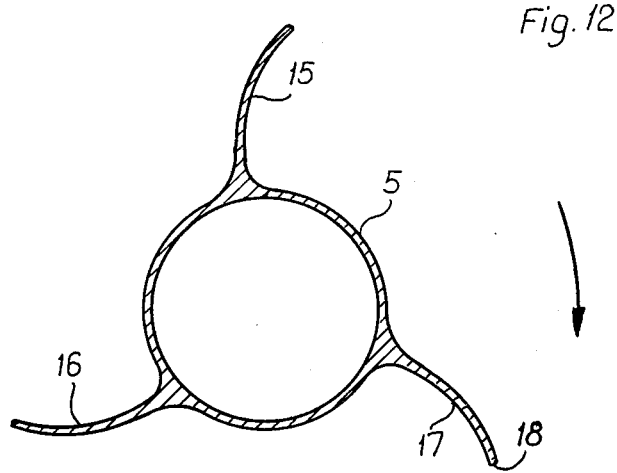
FIGS. 12 and 13 are sectional views on lines XII—XII and XIII—XIII, respectively, in FIG. 11.
Figure 13:
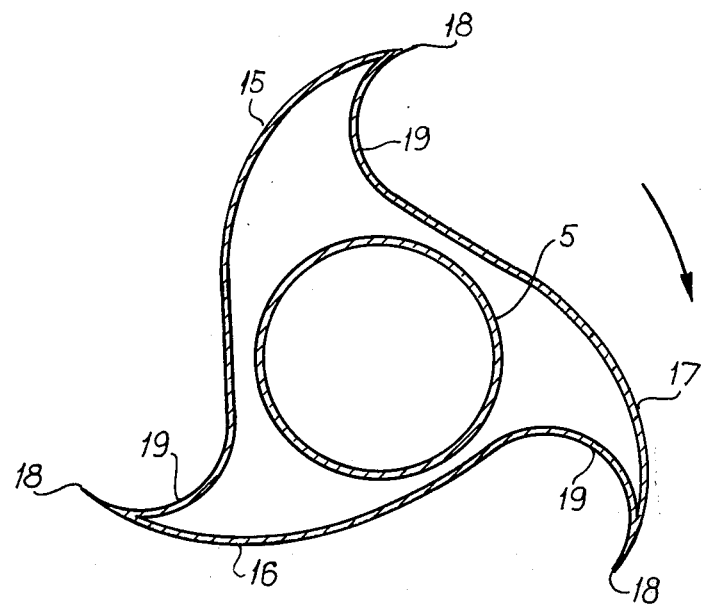

FIGS. 12 and 13 show the shape of the vanes 15, 16 and 17 at different levels of the propeller, and FIG. 13 illustrates the rounded, concave surfaces 19.

Figure 14:
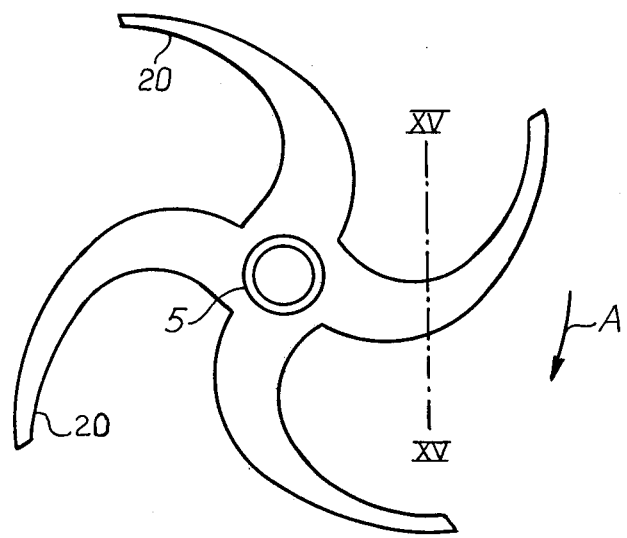
FIG. 14 is a view of a foam knife as seen in the axial direction of the hollow shaft.

FIG. 14 shows the shape of helically curved arms 20 fixed to the hollow shaft 5 to provide a foam knife 8. Their helical shape prevents sticking of solids when the hollow shaft rotates in the operating direction A.

Figure 15:
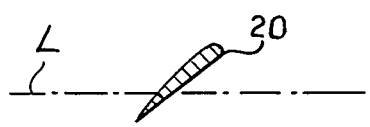
FIG. 15 is a sectional view on line XV—XV in FIG. 14.

FIG. 15 shows a cross-section of an arm 20, and the line L indicates the plane of rotation of the arms 20. This figure shows how the arms 20 are inclined so as to act as fan vanes. When the hollow shaft rotates in the operating direction, the arms suck foam from the foam layer above the surface of the liquid and beat it asunder.

I claim:

1. In combination with a body of liquid, a device for supplying gas to said liquid and revolving the liquid, said device comprising a hollow shaft for supplying gas to the liquid and having a free lower end portion provided with a gas outlet immersed in the liquid, means to supply gas to the hollow shaft, a propeller carried by said free end portion of the shaft, and means to drive said propeller for revolving the liquid said propeller including at least two screw-shaped vanes, at least a part of the surface of each vane forming an acute angle with the longitudinal axis of the hollow shaft, as seen from the free end of the shaft, each said vane extending along at least two thirds of the circumference of the hollow shaft, said vanes being uniformly distributed around the circumference of the hollow shaft, a surface of one said vane at the free end of the hollow shaft being joined at its outer edge to a surface of an adjacent vane to provide a rounded concave surface facing away from the hollow interior of the shaft, said concave surface being situated radially a distance outside the outer surface of said shaft.

2. The combination of claim 1, in which each said vane is arched in the direction toward the free end of the hollow shaft.

3. The combination of claim 1, in which the pitch of a said vane decreases in the axial direction toward the free end of the hollow shaft.

4. The combination of claim 1, in which the radius of a said vane increases toward the free end of the hollow shaft.

5. The combination of claim 1, in which said gas outlet is at said lower end of the shaft and widens downward in the shape of a funnel.

6. The combination of claim 1, in which the free end of the hollow shaft extends downward beyond the lower end of the lowest vane.

7. The combination of claim 1, in which a said vane extends downward beyond the free end of the hollow shaft to form a fin-like part.

8. The combination of claim 1, in which the hollow shaft has at least one lateral gas outlet opening located between adjacent vane surfaces, the combination comprising also a shielding member extending adjacent said opening substantially tangentially of the shaft.

9. The combination of claim 1, comprising also a cardan carrying the hollow shaft.

10. The combination of claim 1, comprising also foam-cutting arms fixed to the hollow shaft above the level of said liquid, said arms being shaped helically and directed radially from the shaft.

11. The combination of claim 10, in which the arms are inclined in cross-section to act as fan vanes.

* * * * *